United States Patent [19]

Lane

[11] Patent Number: 4,964,022
[45] Date of Patent: Oct. 16, 1990

[54] BUS SIDE LIGHT SYSTEM

[76] Inventor: Robert Lane, P.O. Box 441, Granger, Ind. 46530

[21] Appl. No.: 335,550

[22] Filed: Apr. 10, 1989

[51] Int. Cl.$^5$ ............................................. B60Q 1/02
[52] U.S. Cl. ...................................... 362/80; 362/227
[58] Field of Search ...................... 362/61, 74, 76, 80, 362/227

[56] References Cited

U.S. PATENT DOCUMENTS

| 961,887 | 6/1910 | McAloney | 362/76 |
| 1,072,096 | 9/1913 | Dean | 362/76 |
| 2,065,876 | 12/1936 | Siegfried | 362/80 |

FOREIGN PATENT DOCUMENTS

| 572597 | 3/1933 | Fed. Rep. of Germany | 362/74 |
| 815754 | 4/1937 | France | 362/74 |
| 1031294 | 6/1953 | France | 362/74 |
| 365914 | 1/1932 | United Kingdom | 362/74 |

Primary Examiner—Ira S. Lazarus
Assistant Examiner—Richard R. Cole
Attorney, Agent, or Firm—Todd A. Dawson; James D. Hall

[57] ABSTRACT

A lighting system mounted to public transportation vehicles which includes a multiple directional light positioned above the exit door of the vehicle so as to provide illumination for the ground or pavement in front of the exit door to aid and assist passengers entering or departing the vehicle.

2 Claims, 2 Drawing Sheets

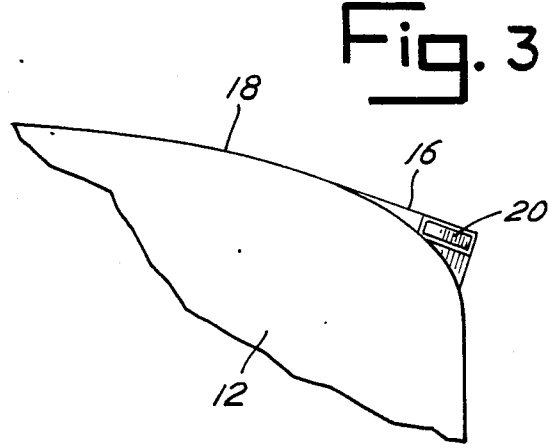
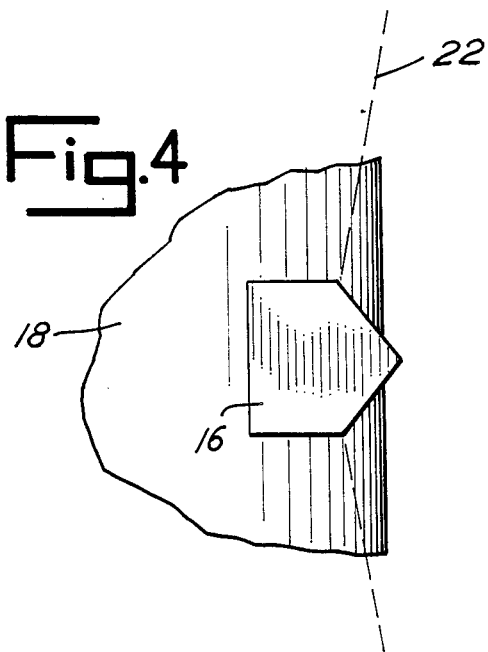

BUS SIDE LIGHT SYSTEM

SUMMARY OF THE INVENTION

This invention relates to vehicle lighting systems and will have specific application to a lighting system utilized upon bus or a similar transportation vehicle which aid passengers departing or entering the vehicle.

A multiple directional light housing is mounted to the bus body adjacently above the entrance and exit doors of the bus. The light housing is so positioned that the side of the bus in front of the entrance and exit doors is illuminated to enable the departing or entering passengers to see the surrounding ground or pavement and to observe the relationship between such ground or pavement and the steps of the vehicle. When the lighting system of this invention is utilized upon school type buses, the departing students will be illuminated as they await or leave the bus so as to alert other vehicles in the area of the presence of the students and children. Thus, a lighting system can be installed at the opposite side of the bus to illuminate both roadsides.

Accordingly, it is an object of this invention to provide a lighting system which is for a transportation vehicle and which improves the safety of the use and operation of the vehicle.

Still another object of this invention is to provide a bus having an exit lighting system for the purpose of illuminating the exit area.

Another object of this invention is to provide a safety lighting system utilized in conjunction with a school bus which enables the students or children entering or exiting such bus to be illuminated and, therefore, visible to other vehicular traffic.

Other objects of this invention will become apparent upon a reading of the following description.

BRIEF DESCRIPTION OF THE DRAWINGS

A preferred embodiment of this invention has been chosen for purposes of illustration wherein:

FIG. 3 is a fragmentary elevational view of a bus body showing the mounted light housing of this invention.

FIG. 4 is a fragmentary plan view of the bus body and light housing.

DESCRIPTION OF THE PREFERRED EMBODIMENT

Figure 1:
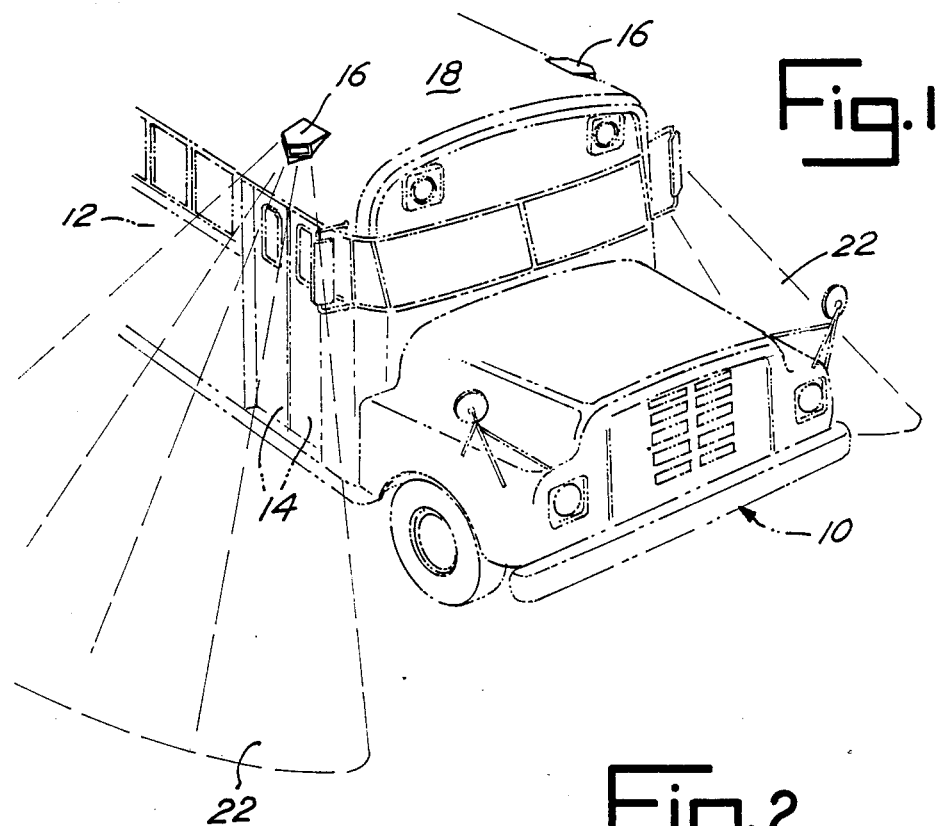
FIG. 1 is a partial perspective view of a school bus used in combination with the lighting system of this invention.
Figure 2:
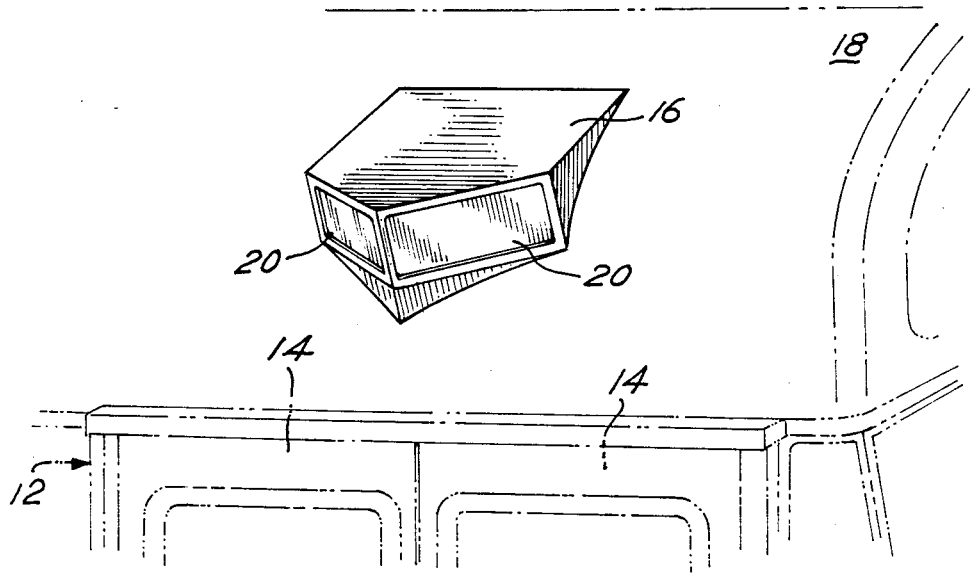
FIG. 2 is a more detailed fragmentary view of the school bus of FIG. 1 as viewed from its right side to illustrate the mounted light housing of this invention.

The preferred embodiment illustrated is not intended to be exhaustive or limit the invention to the precise form disclosed. It is chosen and described to best explain the principles of the invention, its application and practical use to enable others skilled in the art to best utilize the invention.

Bus 10, which may be of any standard form or construction adapted to transport individuals and which is shown in the illustrated embodiment as a school bus, includes a body 12. Bus 10 includes the usual motorized means by which the bus may be driven from one location to another. A plurality of doors 14 are hinged to body 12 and, in the customary manner, are actuatable between open and closed positions to allow the passengers within the bus to enter and exit. While in the accompanying figures, only one set of doors 14 are illustrated, it is to be understood that the same side of the bus may also carry another similar set of doors. As thus far described, bus 10 is of a standard well known construction.

A light housing 16 is mounted to the roof 18 of bus body 12 above each set of doors 14 and at the opposite side of the bus. Light housing 16 is a water resistant structure having two angularly disposed sealed beam lights 20 mounted within the housing. Lights 20 are preferably angled apart between 90° and 135° and are so located upon roof 18 so as to cast a wide continuous beam 22 upon the ground or pavement next to underlying doors 14 and along the side of the bus. Beam 22 is of a sectored form having an illuminating length of at least 30 feet and preferably at least four times the width of bus 10 in an outwardly lateral direction from bus body 12 so as to enable the beam to illuminate students, children or other passengers which are waiting for or departing from the bus. Beam 22 is also adapted to cover an angular range of nearly 180° which would illuminate the full side of the bus forwardly and rearwardly of doors 14.

Lights 20 within light housing 16 are connected into the electrical system for the bus and may be automatically lit when the doors of the bus are open to discharge or receive passengers. Should light housing 16 be utilized in conjunction with a school bus as illustrated in the figures, the lights can be turned on and off at the same time the red flashing warning lights of the school bus are activated during receipt or discharge of students. The manner in which lights 20 are activated and connected into the bus's internal lighting system is well within the skill of the art and will not be described in detail.

The invention is not to be limited to the details above given but may be modified within the scope of the appended claims.

What I claim is:

1. In combination, a transportation vehicle and lighting system, said combination wherein said vehicle includes one or more side doors through which passengers of the vehicle enter and exit, a light housing mounted to one side of said vehicle and positioned above at least one of said doors, said light housing including electrical lighting means for directing a wide beam of light laterally outwardly from said vehicle along the vehicle at each side and forwardly thereof, wherein said lighting means includes two sealed beam lights carried within said light housing and positioned with respect to each other in angularly displaced manner so as to produce said wide beam of light directed along the side of said vehicle and laterally outwardly from said vehicle for a distance of at least one width of said vehicle, each of said sealed beam lights including a housing having a transparent lens, said sealed beam lights carried by said light housing such that front lenses of said sealed beam lights constitutes a front face for said light housing.

2. The combination of claim 1 wherein said sealed beam lights are angled between 90° and 135° apart.

* * * * *